J. WEST.
MACHINE FOR FORMING OPEN-END ENVELOPS.
APPLICATION FILED MAY 25, 1907.

1,010,833.

Patented Dec. 5, 1911.
10 SHEETS—SHEET 4.

Witnesses:
Max B. A. Doring.
Isabel Pearse.

Inventor
James West,
By his Attorneys
Prindle and Williamson

J. WEST.
MACHINE FOR FORMING OPEN-END ENVELOPS.
APPLICATION FILED MAY 25, 1907.

1,010,833.

Patented Dec. 5, 1911.
10 SHEETS—SHEET 5.

Witnesses:
Max B. A. Doring.
Isabel Pearce,

Inventor
James West,
By his Attorneys
Prindle and Williamson

J. WEST.
MACHINE FOR FORMING OPEN-END ENVELOPS.
APPLICATION FILED MAY 25, 1907.

1,010,833.

Patented Dec. 5, 1911.
10 SHEETS—SHEET 6.

J. WEST.
MACHINE FOR FORMING OPEN-END ENVELOPS.
APPLICATION FILED MAY 25, 1907.

1,010,833.

Patented Dec. 5, 1911.

J. WEST.
MACHINE FOR FORMING OPEN-END ENVELOPS.
APPLICATION FILED MAY 25, 1907.

1,010,833.

Patented Dec. 5, 1911.
10 SHEETS—SHEET 10.

Witnesses:
Max B. A. Doring.
Isabel Pearce.

Inventor
James West,
By his Attorneys
Prindle and Williamson

UNITED STATES PATENT OFFICE.

JAMES WEST, OF BROOKLYN, NEW YORK, ASSIGNOR TO WEST ENVELOPE COMPANY, OF BROOKLYN, NEW YORK, A CORPORATION OF NEW YORK.

MACHINE FOR FORMING OPEN-END ENVELOPS.

1,010,833.  Specification of Letters Patent.  Patented Dec. 5, 1911.

Application filed May 25, 1907. Serial No. 375,698.

*To all whom it may concern:*

Be it known that I, JAMES WEST, of Brooklyn, in the county of Kings, and in the State of New York, have invented a certain new and useful Improvement in Machines for Forming Open-End Envelops, and do hereby declare that the following is a full, clear, and exact description thereof, reference being had to the accompanying drawings, in which—

The object of my invention has been to provide a machine for forming open-end envelops, by which such envelops can be formed with great rapidity and at very low cost; and to such ends, my invention consists in the machine for forming open-end envelops hereinafter specified.

I have chosen for illustration the machine hereinafter described, but it is to be understood that the invention may take other forms.

The envelop which it is the purpose of my machine to form, consists, as illustrated in Figs. 19 to 23, of a body A having side-flaps B and C, the latter having strips of adhesive D along its longest edge. There is also a bottom-flap E which is held as by a strip of adhesive F, applied to the back of the envelop, there being also a closing-flap G. The completed envelop has the flap C folded over the flap B, and secured thereto by the strip of adhesive D, and the bottom flap E folded over on top of the flaps B and C. The side-flaps B and C may be made slightly longer than the main body of the envelop, as shown in Figs. 19, 20 22 and 24 forming the projecting portions $b$ and $c$, and when the bottom fold of the envelop is formed, these portions $b$ and $c$ are folded over, making a double fold that affords a solid bottom for the envelop. In making such envelop by my machine, the strip of adhesive D is supplied continuously along one edge of the strip of paper H. The strip of paper H is then scored to form cut-outs I, which delineate the top and bottom edges of the top and bottom flaps G and E, and the side edges of the side-flaps B and C. The cut-outs I are then removed, leaving the notches K, after which the scores L, separating the side-flaps from the body, are formed. The side-flap B is then turned over onto the body of the envelop, after which the side-flap C is turned onto the flap B and secured thereto. The strip of adhesive F is then applied to the back of the envelop upon the flaps B and C, after which the score M is formed, which marks the line between the top and bottom flaps. The nearly formed envelop is then separated along the score M from the body of the strip, and a score N, marking the line between the bottom-flap and the body of the envelop, is next formed, said flap being then turned over to adhere to the strip F, the envelop being completed by forming the score O, which separates the top flap and the body of the envelop.

I will now describe one machine which is suitable for the practice of my invention, but it is to be understood that the practice of the invention is not to be limited to the use of this particular machine, but my invention may be practiced by any machine which will perform the requisite operations in such order as may be necessary.

Figures 15, 16:
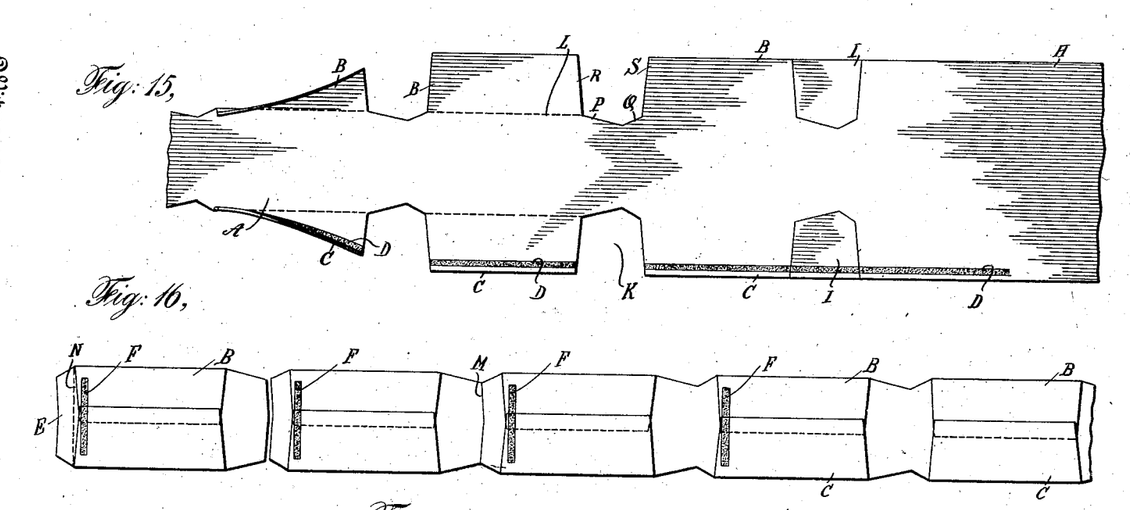
Figs. 15, 16, 17 and 18, are views showing the successive steps of forming an envelop.
Figure 17:
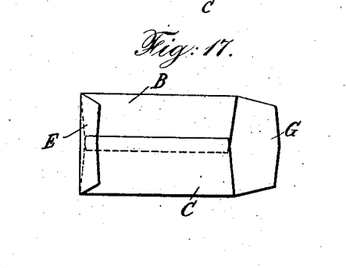
Figure 18:
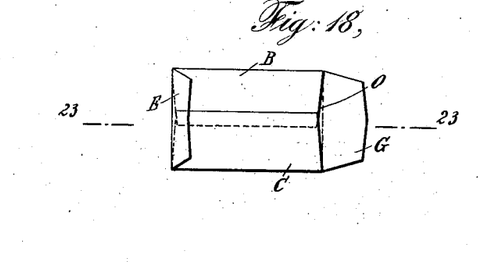
Figures 19, 20:
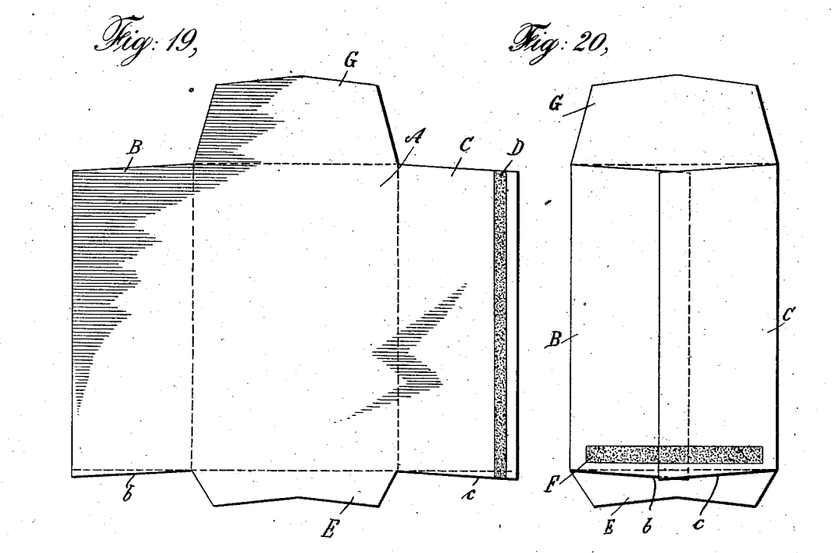
Figs. 19, 20 and 22 are respectively enlarged views of one of my envelops opened out, partly formed, and completely formed, showing a slightly different modification of the side flaps, Fig. 22 being a sectional view.
Figure 21:
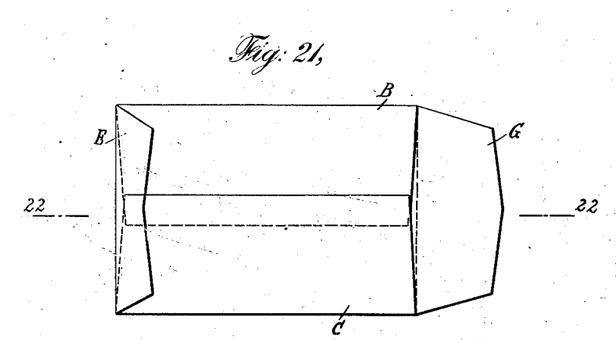
Figs. 21 and 23 are respectively enlarged views of the first modification shown, Fig. 23 being a section taken on the line 23—23 of Fig. 18.
Figure 22:
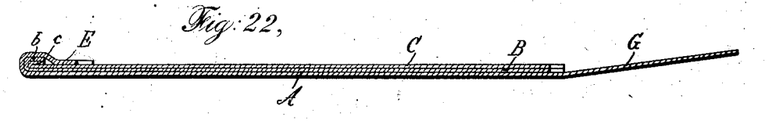
Figure 23:
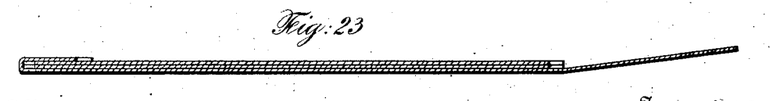

Such machine comprises a frame having a support at one end for a roll of paper 25, the details of which support it is not important to describe. From the roll 25 the strip H passes beneath a round and preferably stationary rod 26, which produces sufficient friction upon the paper to prevent its slacking in going through the machine. From the rod 26 the strip of paper passes beneath a roller 27 and over rollers 28, all of which rollers may be mounted in stationary bearings on the machine. Above the rollers 28 are cutting-rollers 29, the latter being mounted on a shaft 30 that has bearing in blocks 31 which are mounted in guides 32, there being a spring 33 beneath the blocks, and a screw 34 above the blocks, to enable the shaft 30 to yield. A piece of rubber 35, or other yielding substance, may be placed between the blocks 31 and the screw 34. Each roller 29 consists of a disk 36 having cutting edges 37 and 38, which respectively form the lines P and Q (Fig. 15), and of a body 39 having slots in which are mounted knives 40 and 41, forming the lines R and S (Fig. 15). The lines P and Q are substantially transverse to the axis of the rollers 29. The cutting edges 37 and 38 are substantially transverse to the axis of such rollers, and, therefore, only a small portion of such edges is cutting at any given moment. For this reason it is practicable to make such cutting edges with very obtuse angles, and thus to enable them to stand a large amount of cutting without needing sharpening. Hence I form these cutting edges on the separate hardened disks 36. The lines R and S, however, are nearly parallel to the axis of the rollers 29, and, therefore, cutting takes place along a considerable portion of such knives at the same time. Therefore, these knives must be sharper than the edges 37 and 38. I consequently make the knives 40 and 41 in the form of separate blades seated in slots in the body 39, and secured therein by screws 42. The cutting edges 37 and 38 preferably cut against a plain, hardened disk 43, forming part of the lower rollers 28, and the knives 40 and 41 cut against pieces of rawhide seated in slots 44 formed in the bodies 45 of the said lower rollers. The upper and lower rollers 29 and 28 are adjustable along their respective shafts, in order that the same machine may make different widths of envelops.

Figure 1:
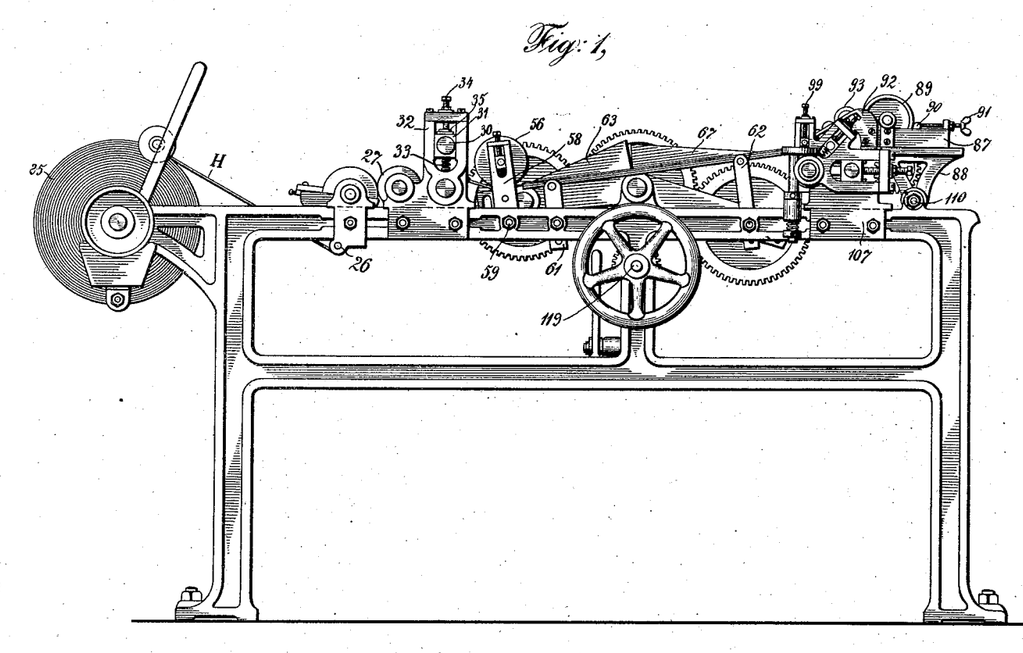
Figures 1 and 2 are side elevations of the opposite sides of a machine embodying my invention.
Figures 2, 24:
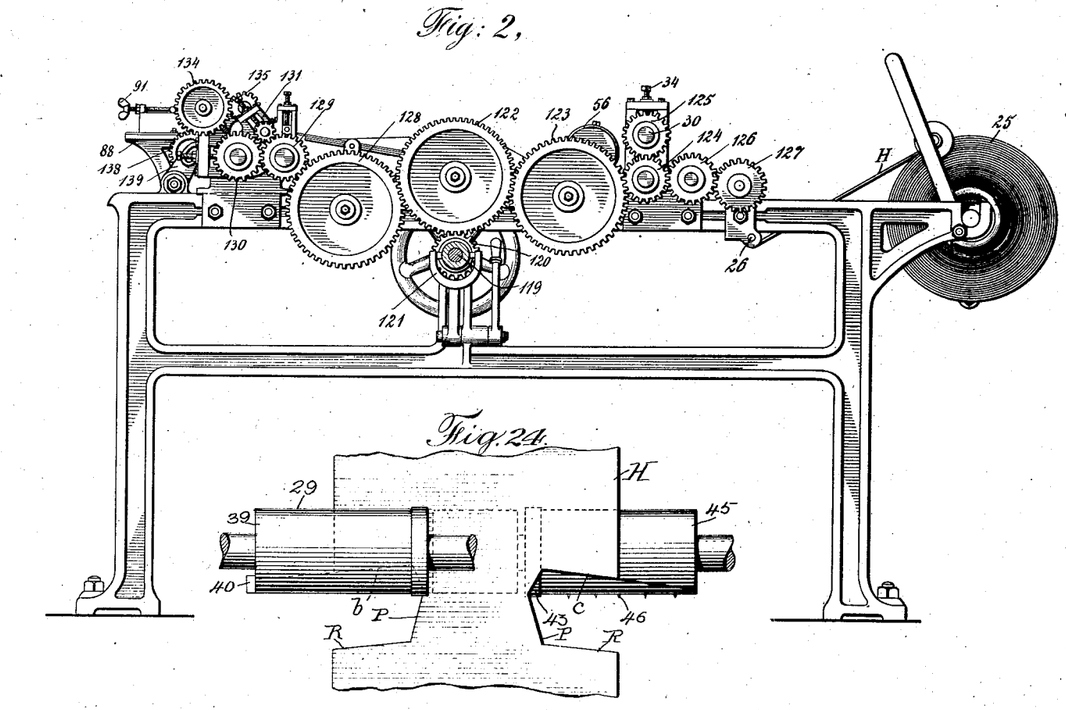
Fig. 24 is a view of the cutter rolls similar to the view shown in Fig. 6, the cutter rolls in this figure, however, being constructed to produce the modification shown in Figs. 19, 20 and 22.
Figure 3:
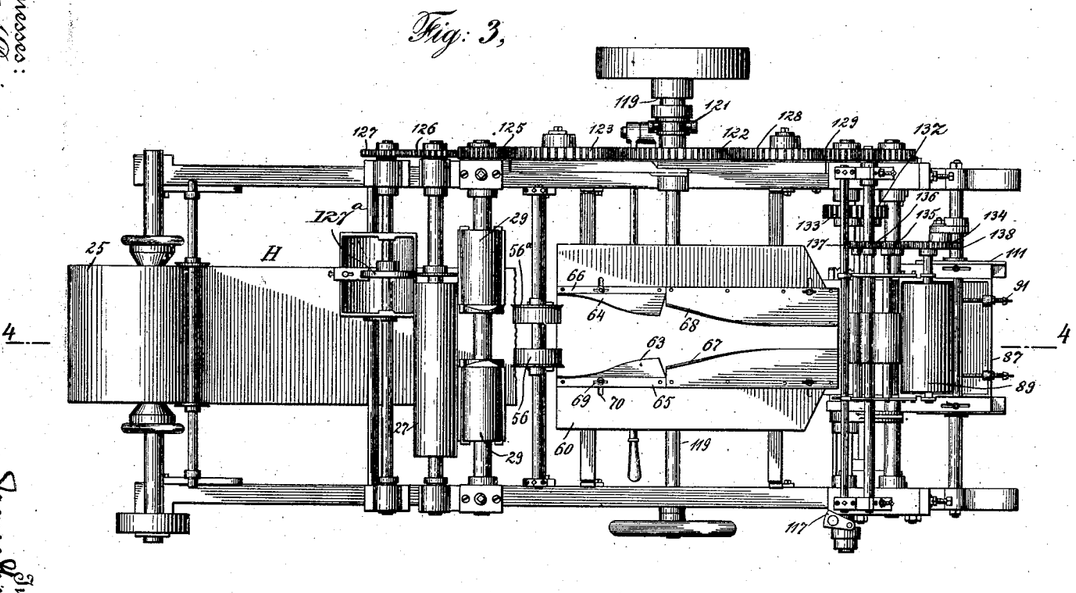
Fig. 3 is a plan view of Fig. 1.
Figure 4:
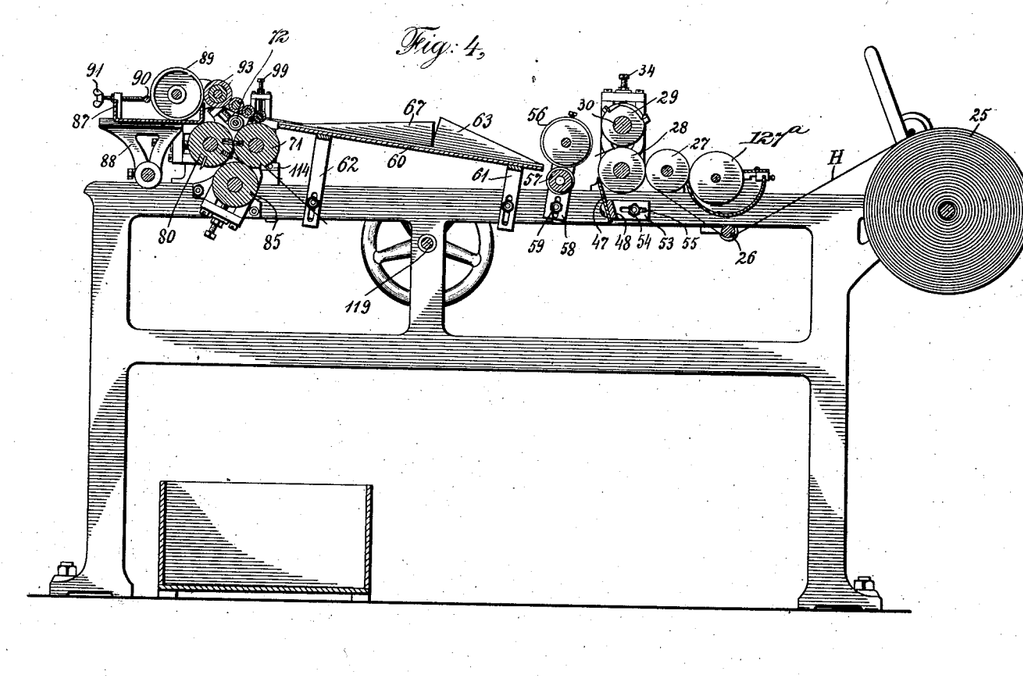
Fig. 4 is a section on the line 4—4 of Fig. 3.
Figure 5:
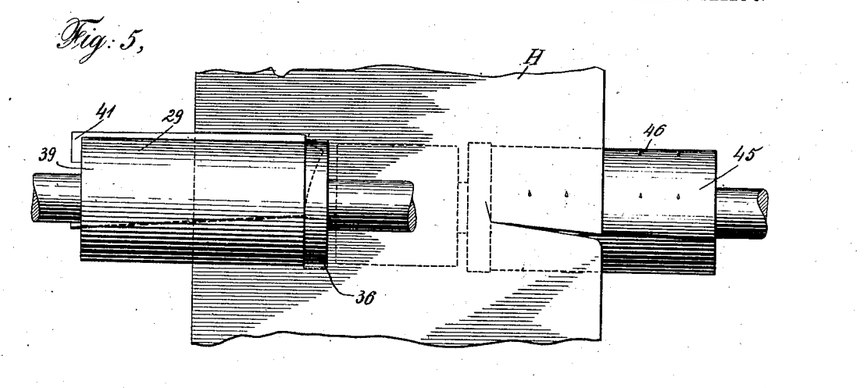
Figs. 5 and 6 are plan views of cutting rolls used in said machine.
Figure 6:
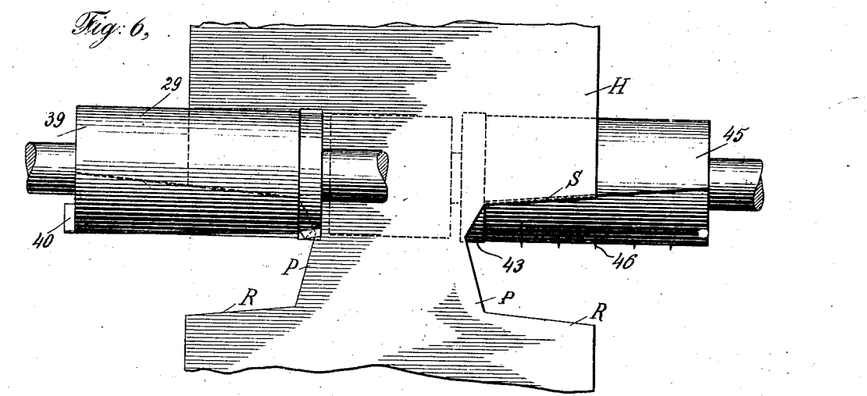
Figure 7:
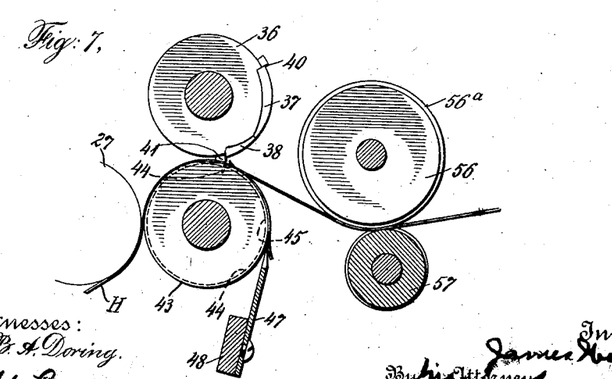
Fig. 7 is a side elevation of Fig. 6.
Figure 8:
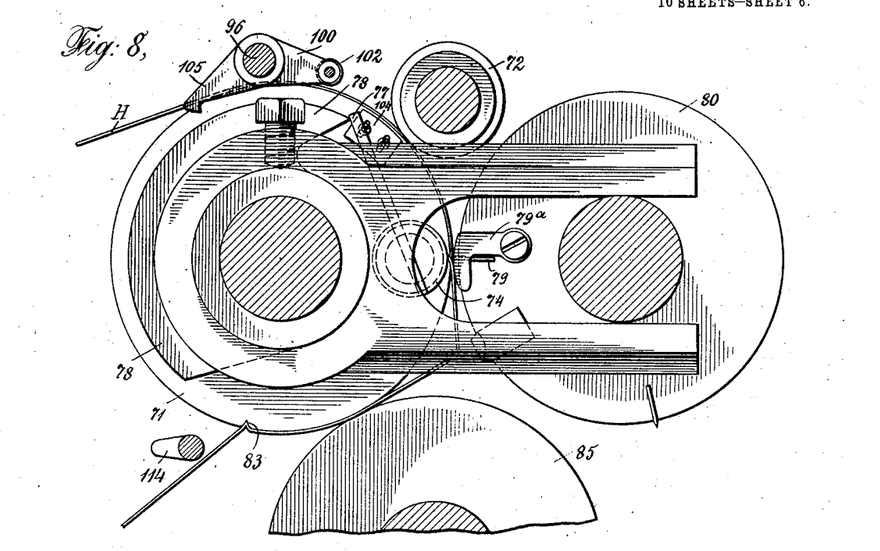
Figs. 8 and 9 are respectively a side elevation and a vertical sectional view of folding and cutting devices used in said machine.
Figure 9:
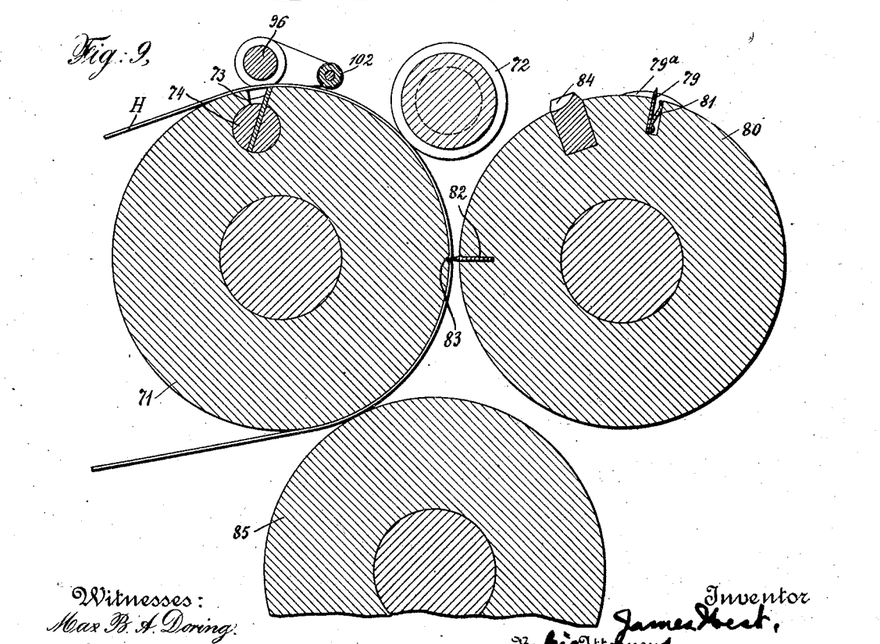
Figure 10:
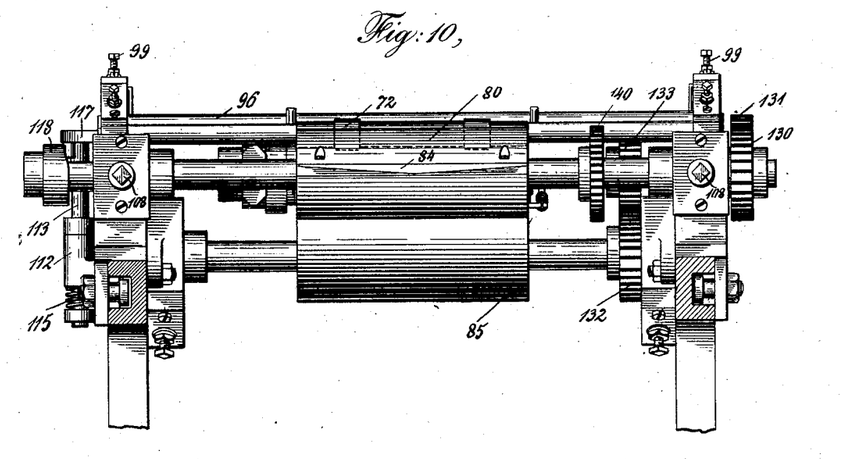
Fig. 10 is a rear view of the parts shown in Fig. 8.
Figure 11:
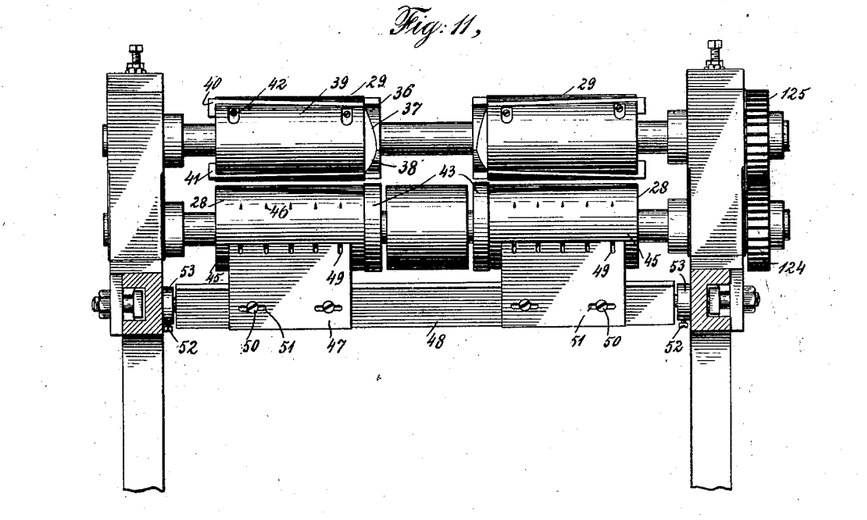
Fig. 11 is a front elevation of the cutting devices illustrated in Figs. 5 to 7.
Figure 12:
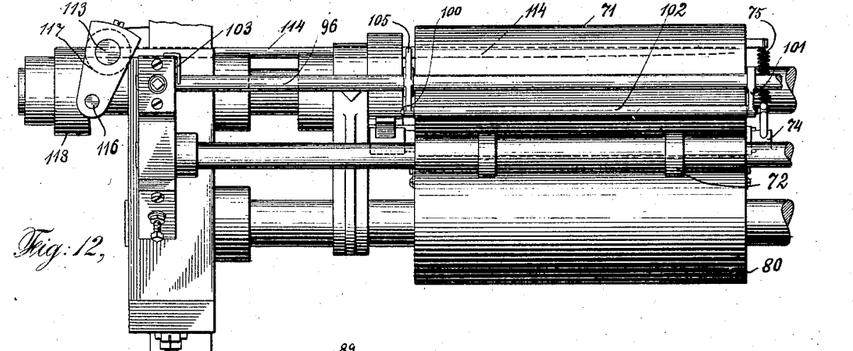
Figs. 12, 13 and 14 are respectively a top plan view, a central sectional view, and a side view of the pasting devices used in said machine.
Figure 13:
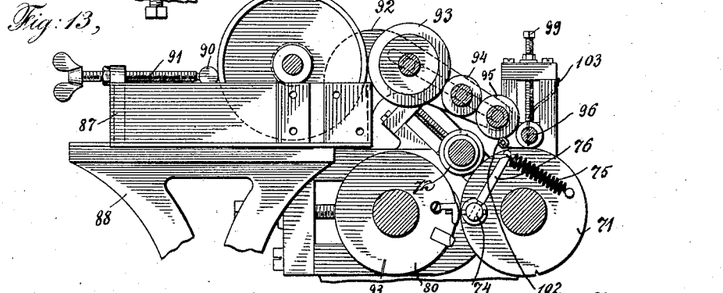
Figure 14:
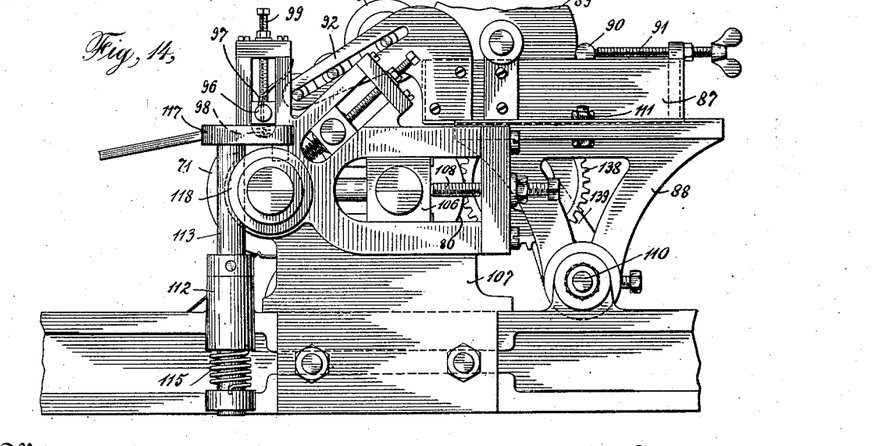

In order that the cut-outs I may be positively removed, the lower rollers 28 are provided with pins 46 so positioned on the rollers as to be beneath the portions which are to form the cut-outs, and the tension of the strip of paper forces the pins through the paper, so that, as shown in Fig. 7, after the cut-outs have been scored, they adhere to and are carried around by the pins. The cut-outs are stripped off the pins by plates 47 secured to a cross-bar 48 of the frame, the plates being provided with slots 49, to permit the passage of the pins. The plates are adjustably secured to the cross-bar by screws 50 passing through elongated slots 51 in the plates. The cross-bar 48 has trunnions which are adjustably secured by screws 52 in holes formed in plates 53 that are secured to the side-bars of the frame by bolts 54 passing through elongated slots 55 in the plates, the arrangement permitting the stripper-plates 47 to be readily adjusted to the desired position relative to the rollers 45.

The cutting apparatus herein described is not claimed in the present application, but is the subject of a separate application for patent.

From the cutting apparatus the strip H of paper passes between an upper pair of rollers 56 and a lower pair of rollers 57, the upper rollers 56 being each provided with a scoring edge 56ª for forming the scores L, separating the side-flaps from the body of the envelop. These rollers are journaled in bars 58 that are secured to the side-frames by bolts 59 passing through slots in said bars, whereby the positions of said rollers may be adjusted as desired. The pairs of rollers 56 and 57 are adjustably secured to their shafts, so that they may be adjusted for different widths of envelops. After leaving the scoring rollers, the strip H passes over the plate 60 that is adjustably supported by means of yokes or legs 61 and 62, which are secured to the side-frames by bolts passing through slots in the legs. Warped plates 63 and 64 are respectively secured to strips 65 and 66, which latter are bolted to the plate 60, the said warped plates being for the purpose respectively of partly folding over the side flaps B and C. A second pair of warped plates 67 and 68 is secured to the strips 65 and 66 to complete the turning over and folding down of the side-flaps B and C. The strips 65 and 66 are secured to the plate 60 by screws 69 passing through slots 70 in the said plate 60, whereby the warped plates can be adjusted for envelops of different widths. From the plate 60, the strip H passes around a roller 71, being held down upon said roller by a roller 72. The roller 71 has a gripper-plate 73 that is mounted on a shaft 74 journaled in the said roller, the gripper-plate being held against the forward wall of a slot in the roller by the tension of a spring 75 fastened to a pin in the roller, and to an arm 76 that is secured to the shaft 74. The end of the shaft 74 opposite that having the arm 76 is provided with an arm 77 that is adapted to ride over a cam-plate 78 adjustably secured in a fixed position, so that the said cam-plate vibrates the arm 77 in opposition to the tension of the spring 75, thereby moving the gripper-plate 73 away from the front wall of its slot. The cam-plate 78 is so positioned that this shall occur at the same time that a tucker-blade 79, yieldingly mounted in a slot in a roller 80, comes between the gripper-plate 73 and the front wall of its slot, so that a fold of the paper is tucked between the gripper-plate and the front wall of its slot, thereby forming the bottom fold N of the envelop. The tucker-blade 79 may be loosely mounted in its slot in the roller 80, and a spring 81 may be riveted to the tucker-blade and bear against the wall of the slot, to yieldingly hold the tucker-blade in position. The blade 79 projects beyond the ends of the roller 80 and is engaged by hooks 79ª that are pivoted to the roller 80, and thus serve to hold the blade in its slot. The roller 80 also carries a scoring-plate 82 that is adapted to force the paper into a score 83 formed in the said roller 71, to form the score O at the base of the closing-flap of the envelop. The roller 80 also carries a knife 84, preferably having a blunt edge, that is adapted to cut against the roller 71, and sever the blank from the strip H by forming the score M.

Beneath the roller 71 is a roller 85 that bears against the said roller. The bottom flap of the envelop strikes this roller and is turned over against the body of the envelop. In order to secure the bottom flap to the bottom of the envelop, the strip F of paste is applied to the bottom of the envelop in the following manner: A paste-pan 87 is mounted upon brackets 88, and has journaled thereon a dipping-roller 89. The amount of paste taken up by the dipping roller is regulated by a rod 90 that is held at the desired distance from the roller 89 by thumb screws 91. The paste-pan carries arms 92 having slots formed therein, in which are journaled a series of transfer rollers 93, 94 and 95, whereby paste is taken from the roller 89 and conveyed to a point over the roller 71. A shaft 96 is journaled in blocks 97 mounted in brackets above the roller 71, the blocks 97 being preferably seated upon springs 98, and held down by screws 99. The shaft 96 carries arms 100 and 101, in which is journaled a glue-applying roller 102. A spring 103 secured to the shaft 96 and resting against the bearing bracket, tends to hold the roller 102 away from the paper. The roller 102 is depressed upon the paper at the proper time by the engagement of a plate 104 that is adjustably mounted on the roller 71, with a cam-arm 105 that is preferably formed in one piece with the arm 100. Thus the roller 102 takes paste from the roller 95 and applies it at the proper time to form the strip F.

The roller 71 is journaled in fixed bearings. The roller 80 is journaled in blocks 106 mounted in guide ways formed in a bracket 107 on the frame, the position of the roller being determined by screws 108. The paste-pan 87 together with its rollers, is mounted on brackets 88, as before stated, that are adjustably secured to pivoted pins 110 on the frame, whereby the entire pasting apparatus can be readily adjusted to bring the roller 95 in proper relation to the roller 102, and whereby the entire apparatus can be removed. The pan 87 is mounted between guides on the brackets 88 and secured in place by bolts 111.

The frame is provided with a vertical bearing 112, in which is mounted a rock-shaft 113, carrying an arm 114, that projects across the path of the envelops as they are carried around by the roller 71. The arm 114 is swung into a position close to and parallel with the roller 71 by a spring 115 coiled on the shaft 113 and engaging the bearing 112 and a collar on the said shaft. The arm 114 is swung away from the roller by engagement of a pin 116 on a rock arm 117 carried by the shaft 113, with a cam 118, on the shaft of the roller 71. As the closing flap tends to stick to the roller 71, the arm 114 swings in and strikes the body of the envelop, causing the envelop to become detached from the roller 71, but as this can only take place after the bottom fold of the envelop has been released from the gripper (which action does not take place until after the gripper has passed the arm 114) the arm 114 is held out of the way until the gripper has released the bottom fold, and the envelop has dropped, when the arm 114 swings over the body of the envelop, and thus releases the closing flap from the roller.

The gearing for driving the parts of said machine is simple.

Power is applied to the driving shaft 119, which carries a gear 120, with the usual clutch 121 for engaging and disengaging said gear. The shaft also has a hand-wheel for turning the parts of the machine by hand in adjusting and inspecting the machine. The gear 120 meshes with a gear 122 journaled on the frame of the machine, and the latter gear, by means of an idler 123, drives a gear 124 on the shaft of the roller 28, the roller 29 being driven by a gear 125 meshing with the gear 124. The gear 124 also meshes with a gear 126 on the shaft of the roller 27, and the latter gear meshes with a gear 127 on the shaft of the adjacent paste roller 127ª of the ordinary type. The gear 122, by means of an idler 128, transmits motion to a gear 129 on the shaft of the roller 71, the latter gear driving gears 130 and 131, which are respectively on the shafts of the rollers 80 and 72. The shaft of the roller 85 carries a pinion 132 which receives motion from a pinion 133 on the shaft of the roller 71. The paste rollers 89, 93, 94, and 95 have intermeshing gears 134, 135, 136 and 133

137 respectively, the gear 134 meshing with an intermediate gear 138 mounted on a bracket 139, the gear 138 receiving motion from a gear 140 on the shaft of the roller 80.

The operation of the foregoing machine has been fully indicated in the description of the machine, but it may be briefly summarized as follows: The paper on the roll passes beneath the paste roller 27, and the strip of paste D is applied thereto. The paper passes over the roller 28, and is impaled upon the pins 46 at the point where the cut-outs are to be removed. The cut-outs are scored and by the joint action of the pins 46 and the plate 47 are removed from the paper, thus forming the side-flaps and side-edges of the top and bottom flaps. The paper passes up along the plate 60, folding over the side-flap B and then the side-flap C, the strip of paste D serving to secure these flaps together. The paper then passes over the roller 71 and has the strip of paste F applied thereto. The bottom fold of the envelop is then engaged in the gripper, the lower portions $b$ and $c$ of the side-flaps being engaged in said gripper so as to be folded over and to form a solid bottom of the envelop. As the envelop proceeds, the bottom flap strikes the roller 85 and is folded over onto the side flaps B and C, and is firmly pressed down on the strip of paste F. Meanwhile the arm 114 has been swung out of the way. The knife 84 then severs the envelop from the blank, after which the gripper lets go of the bottom fold of the envelop, the envelop swinging down, and the arm 114 swings over the envelop to detach the closing flap from the roller 71.

I claim:—

1. In an envelop-making machine, the combination of means for feeding a strip of paper, means for cutting out portions at the edges of such strip to form side flaps and the side edges of the top and bottom flaps, means for folding the side flaps over one another, means for folding over an end flap, and means for severing the blank from the strip along a line producing an angularly-pointed top flap and a bottom flap having a reëntrant angle.

2. In an envelop-making machine, the combination of means for feeding a strip of paper, means for applying a single continuous strip of adhesive along the edges of such strip, means for cutting out portions of the edges of such strip to form side flaps along the edges, means for folding over the side flaps, means for folding over an end flap, and means for severing the blank from the strip, said means being provided with mechanical connections to cause them to operate in the order named.

3. In an envelop machine, the combination of means for feeding a strip of paper, means for applying a strip of adhesive along the edge of such strip, means for cutting out portions along the edges of the strip to form side flaps and the side edges of the top and bottom flaps, means for folding over the unpasted side flap, means for folding over the pasted side flap, means for forming a fold in the free end of the envelop, in a line crossing the side flaps, means for applying paste to secure the end flap, means for folding the end flap, and means for severing the blank.

4. In an envelop machine, the combination of means for feeding a strip of paper, means for applying a strip of adhesive along the edge of such strip, means for cutting out portions along the edge of such strip before any portions are cut therefrom to form side flaps and the side edges of the top and bottom flaps, means for folding over the unpasted side flap, means for folding over the pasted side flap, means for forming a fold in the free end of the envelop in a line crossing the side flaps, means for applying paste to secure the end flap, means for folding the end flap, and means for severing the blank, said several means being provided with mechanical connections to cause them to operate in the order named.

5. In an envelop machine, the combination of means for feeding a strip of paper, means for applying a strip of adhesive along the edge of such strip, means for cutting out portions along the edge of such strip, to form side flaps and the side edges of the top and bottom flaps, means for folding over the unpasted side flap, means for folding over the pasted side flaps, means for forming a fold in the free end of the envelope, in a line crossing the side flaps, means for applying paste to secure the end flap, means for folding the end flap, means for applying paste to the back of the side flaps before the bottom flap, and means for severing the blank, said several means acting in the order named.

6. In an envelop machine, the combination of means for forming an envelop blank from a strip of paper, means for folding the flaps at the sides of the strip of paper, a roller having a gripper, a roller having a tucker blade, said gripper and tucker blade coacting to form a fold transverse to the direction of motion, a third roller that is adapted to turn over and press down the end flap at the gripper, means on said second roller for creasing the remaining end flap of the envelope, and a knife on said second roller adapted to sever the blank from the strip.

7. In an envelop machine, the combination of a roller about which an envelop is adapted to be formed, a gripper in said roller adapted to hold the forward end of the envelop, a pivoted arm, and means for swinging said arm over the body of the envelop after the said body has been released by said gripper, whereby to detach the remaining portions of the envelop from said roller.

8. In an envelop machine, the combination of means for forming an envelop, comprising a roller having a gripper for holding one edge of the envelop, a roller adapted to press the envelop against the under side of said first mentioned roller, means for causing said gripper to release the forward edge of the envelop while the main portion of the envelop is on the under side of said roller, a pivoted arm, and means for retracting said arm while said envelop folds, after being released by said gripper, and means for swinging said arm into the path of said envelop after it has been so released.

In testimony that I claim the foregoing I have hereunto set my hand.

JAMES WEST.

Witnesses:
EDWIN J. PRINDLE,
LILLIE CASS.

Copies of this patent may be obtained for five cents each, by addressing the "Commissioner of Patent Washington, D. C."